US006411190B1

(12) United States Patent
Yamaguchi et al.

(10) Patent No.: US 6,411,190 B1
(45) Date of Patent: Jun. 25, 2002

(54) CIRCUIT BREAKER

(75) Inventors: Noboru Yamaguchi; Takashi Gohara; Yasuhiro Tamai; Hideo Takahashi; Mitsuaki Morimoto; Yoshinori Ikuta, all of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 146 days.

(21) Appl. No.: 09/631,647

(22) Filed: Aug. 2, 2000

(30) Foreign Application Priority Data

Aug. 3, 1999 (JP) .......................................... 11-220340

(51) Int. Cl.[7] ........................ H01H 71/20; H01H 37/76; B60L 1/00; B60K 28/10

(52) U.S. Cl. ........................ 337/401; 337/405; 337/157; 337/408; 361/115; 307/10.1; 307/10.7; 180/279; 200/61.08

(58) Field of Search ................................ 337/401, 157, 337/404–406, 408, 409; 307/119, 9.1–10.8; 180/271, 274, 279, 281–283; 200/61.08; 361/115

(56) References Cited

U.S. PATENT DOCUMENTS 3,660,794 A * 5/1972 Brizzolara .................. 337/401
3,684,923 A * 8/1972 Keeler, II ................... 327/371
3,698,323 A * 10/1972 Apstein et al. ............. 102/262
3,793,501 A * 2/1974 Stonestrom .............. 200/61.08
3,803,374 A * 4/1974 Delgendre et al. ....... 200/61.08
3,873,786 A * 3/1975 Lagofun .................. 200/61.08
3,915,236 A * 10/1975 Stichling ..................... 169/26
3,932,717 A * 1/1976 Dike et al. ............... 200/61.08
3,958,206 A * 5/1976 Klint .......................... 337/160
4,030,061 A * 6/1977 Gaskell et al. ........... 200/61.08
4,124,835 A * 11/1978 Cahill, Jr. ...................... 337/1
4,150,266 A * 4/1979 Patrichi ................. 102/202.14
4,224,487 A * 9/1980 Simonsen ................ 200/61.08
4,311,890 A * 1/1982 Schroder ................. 200/61.08
4,339,638 A * 7/1982 Lascelles et al. ........... 102/216
4,342,978 A * 8/1982 Meister .................... 200/82 B
4,352,082 A * 9/1982 Barry et al. ................ 337/407
4,417,519 A * 11/1983 Lutz ........................... 102/263
4,852,494 A * 8/1989 Williams .................... 102/263
5,254,967 A * 10/1993 Biasutti et al. ............. 337/164
5,535,842 A * 7/1996 Richter et al. .............. 180/271
5,818,122 A * 10/1998 Miyazawa et al. .......... 180/282
6,107,581 A * 8/2000 Tanigawa et al. ......... 200/82 D
6,295,930 B1 * 10/2001 Kume et al. ............. 102/202.5

FOREIGN PATENT DOCUMENTS

JP S64-29756 2/1989
JP 10-55742 A * 2/1998 .......... H01H/39/00
JP 10-241523 A * 9/1998 .......... H01H/39/00
JP 10-324207 A * 12/1998 ........... B60R/21/00

* cited by examiner

*Primary Examiner*—Anatoly Vortman
(74) *Attorney, Agent, or Firm*—Finnegan, Henderson, Farabow, Garrett & Dunner, L.L.P.

(57) ABSTRACT

A current sensor 73 detects a current flowing through a first buss bar 11. When a current value detected by the current sensor 73 became equal to or greater than a threshold current value, a CPU 74 outputs a driving control signal to a driving circuit 77, and the driving circuit 77 operates an, ignitor 29 through a second substrate 65 and a terminal 50. Therefore, the ignitor 29 ignites, a second projection 41 is melted by heat of a heating agent 27, a compression spring 34 is expanded and a thermite case 26 jumps up. Thus, electrical connection between the thermite case 26 and the first and second buss bars 11, 19 is interrupted. Further, since an outer container 61 in which the current sensor 73, the CPU and the driving circuit 77 are accommodated is integrally assembled with the cap 14*a* and the resin case 14*b* in which the thermite case 26, the ignitor 29, the compression spring 34 and the second projection 41 are accommodated, non-operational state of the ignitor 29 due to disconnection of electric wire is not generated.

6 Claims, 5 Drawing Sheets

CIRCUIT BREAKER

BACKGROUND OF THE INVENTION

1. Field of The Invention

The present invention relates to a circuit breaker for interrupting an electric circuit for a short time, and more particularly, to a circuit breaker integrally provided with a breaker portion for interrupting an electric circuit and a control portion for controlling the breaker portion.

2. Description of The Related Art

In an electrical component system provided in a vehicle, when something is wrong with a load of a power window or the like, or when something is wrong with a wire harness or the like constituted by a plurality of electric wires connecting a battery and various loads to each other, a high-current fuse inserted between the battery and the wire harness is blown out to interrupt a connection between the battery and the wire harness, thereby preventing the loads, the wire harness and the like from being burnt and damaged.

However, in the case of the electric component system using such a high-current fuse, even if something is wrong with the load of the power window or the like, or something is wrong with the wire harness or the like connecting the battery and various loads, the fuse is not blown out unless a current equal to or greater than a tolerated value which is previously set for the high-current fuse. Therefore, various protecting apparatuses have been developed for detecting the current and interrupt the connection between the battery and the wire harness when a high current close to the tolerated value is continuously flowing.

FIG. 1 is a sectional view showing one example of the protecting apparatus using a bimetal (Japanese Utility Model Application Laid-open No. S64-29756). The protecting apparatus shown in FIG. 1 is made of insulation resin, and comprises a housing 103 formed at its upper portion with a fuse accommodating portion 102, a lid 113 for closing the fuse accommodating portion 102 such that the latter can be opened and closed, a power source terminal 105 disposed in a lower portion in the housing 103 such that an upper end of the power source terminal 105 projects into the fuse accommodating portion 102 and a lower end thereof is exposed outside, and the exposed portion of the power source terminal 105 being connected to a positive terminal of a battery 104, a load terminal 109 disposed in a lower portion in the housing 103 such that an upper end of the load terminal 109 projects into the fuse accommodating portion 102 and a lower end thereof is exposed outside, and the exposed portion of the load terminal 109 being connected to a load 108 through an electric wire 107 constituting a wire harness 106, a fusible member 110 made of low-melting metal disposed in the fuse accommodating portion 102, and having one end connected to an upper end of the power source terminal 105 and the other end connected to an upper end of the load terminal 109, an intermediate terminal 111 disposed in a lower portion in the housing 103 such that the intermediate terminal 111 is located at an intermediate position between the power source terminal 105 and the load terminal 109 and a lower end of the intermediate terminal 111 is exposed outside, and the exposed portion being connected to a negative terminal of the battery 104, and a bimetal 112 which is made of a long plate-like member comprising two kinds of metal bonded together and which is disposed such as to be opposed to the fusible member 110 such that a lower end of the bimetal 112 is connected to an upper end of the intermediate terminal 111 and an upper end thereof being bent into an L-shape.

When an ignitor switch and the like of the vehicle are operated, and a current is flowing through a path comprising the positive terminal of the battery 104, the power source terminal 105, the fusible member 110, the load terminal 109, the electric wire 107 of the wire harness 106, the load 108, and the negative terminal of the battery 104, and when an abnormal condition occurs in the load 108 or in the wire harness 106 connecting the load 108 and a protecting apparatus 101, and a current equal to or greater than the tolerated value flows through the fusible member 110, the fusible member 110 is heated and blown out for protecting the load 108, the wire harness 106 and the like.

Further, even if something is wrong with the load 108 or the wire harness 106 connecting the load 108 and the protecting apparatus 101, and a large current flows through the fusible member 110, if the current does not exceed the tolerated value, the fusible member 110 is heated by the current following through the latter, and the bimetal 112 starts deforming. When a predetermined time is elapsed from the instant when the large current starts flowing through the fusible member 110, a tip end of the bimetal 112 comes into contact with the fusible member 110, and a large short-circuit current flows through the fusible member 110 in a path comprising the positive terminal of the battery 104, the power source terminal 105, the fusible member 110, the intermediate terminal 111, and the negative terminal of the battery 104, and the latter is blown out.

With the above structure, even when a current equal to or lower than the tolerated value flows for a preset time or longer, the circuit is interrupted to protect the wire harness 106 and the load 108.

As another protecting apparatus investigated by the present inventors rather than this protecting apparatus 101, a protecting apparatus 121 shown in FIG. 2 has been also developed (Japanese Utility Model Application Laid-open No. S64-29756).

The protecting apparatus 121 shown in FIG. 2 comprises a housing 122 made of insulation resin, a power source terminal 124 embedded in one side surface of the housing 122 and having a lower end connected to a positive terminal of a battery 123, and a load terminal 128 embedded in the other side surface of the housing 122 and having a lower end connected to a load 127 through an electric wire 126 constituting a wire harness 125. The protecting apparatus 121 further comprises an electric wire 131 including a fusible lead 129 which is made of low-melting metal and formed into U-shape and a heat-proof coating 130 formed such as to cover the fusible lead 129. The protecting apparatus 121 further comprises a coil 132. The coil 132 is made of shape-memory alloy which is formed into a shape wound around the electric wire 131 as shown in FIG. 2 when it is in a martensite phase state, and which is returned to its original phase shape fastening the electric wire 131 when it is heated from 120° C. to 170° C. The protecting apparatus 121 further comprises an external terminal 133 whose upper end is connected to one end of the coil 132 and whose lower end is connected to a negative terminal of the battery 123.

When an ignitor switch and the like of the vehicle are operated, and a current is flowing through a path comprising the positive terminal of the battery 123, the power source terminal 124, the fusible lead 129 of the electric wire 131, the load terminal 128, the electric wire 126 of the wire harness 125, the load 127 and the negative terminal of the battery 123, and when an abnormal condition occurs in the load 127 or in the wire harness 125 connecting the load 127 and a protecting apparatus 121, and a current equal to or greater than the tolerated value flows through the fusible lead 129, the fusible lead 129 is heated and blown out for protecting the load 127, the wire harness 125 and the like.

Further, even if something is wrong with the load 127 or the wire harness 125 connecting the load 127 and the protecting apparatus 121, and a large current flows through the fusible lead 129, if the current does not exceed the tolerated value, the fusible lead 129 is heated by the current flowing through the latter, and a temperature of the coil 132 rises. When a predetermined time is elapsed from the instant when the large current starts flowing through the fusible lead 129, and the temperature of the coil 132 rises to 120° C. to 170° C., the coil 132 changes from its martensite phase state to its original phase and bites into the heat-proof coating 130 which is softened by heat and comes into contact with the fusible lead 129, and a large short-circuit current flows through the fusible lead 129 in a path comprising the positive terminal of the battery 123, the power source terminal 124, the fusible lead 129, the coil 132, the external terminal 133, and the negative terminal of the battery 123, and the latter is blown out.

With the above structure, even when a current equal to or lower than the tolerated value flows for a preset time or longer, the circuit is interrupted to protect the wire harness 125 and the load 127.

However, in the above-described conventional protecting apparatuses 101 and 121, there are problems as follows.

First, in the case of the protecting apparatus shown in FIG. 1, it is detected whether a large current flows through the fusible member 110 using the bimetal 112 made of two kinds of metals having different thermal expansion coefficients and bonded to each other. Therefore, if the magnitude of the current is flowing through the fusible member 110, the bimetal 112 is deformed, and the time that elapsed before the circuit is interrupted is varied, depending on the current flowing therethrough.

Thus, when a failure that a large current flows intermittently occurs, a temperature of the fusible member 110 does not rise more than a certain value, and there is an adverse possibility that the wire harness 106 or the load 108 may be burnt before the protecting apparatus 101 interrupts the circuit.

In the case of the protecting apparatus 121 shown in FIG. 2, it is detected whether a large current flows through the fusible lead 129 using the coil 132 made of shape-memory alloy. Therefore, if the magnitude of the current is flowing through the fusible lead 129, the coil 132 is deformed, and the time that elapsed before the circuit is interrupted is varied—depending upon the flowing current.

Thus, when a failure that a large current flows intermittently occurs, a temperature of the fusible lead 129 does not rise more than a certain value, and there is an adverse possibility that the wire harness 125 or the load 127 may be heated excessively before the protecting apparatus 121 interrupts the circuit. Further, if the bimetal or shape-memory alloy is used, since the deformation-starting temperature is usually as low as about 100° C., it is difficult to use it at 120° C. to 125° C. which is the using environment temperature condition of the vehicle.

Further, in the protecting apparatuses shown in FIGS. 1 and 2, the heat reaction time of the bimetal 112 or of the coil 132 which is a thermal-deformable electrical conduction member is varied depending upon the current flowing therethrough. Further, the heat reaction of the thermal-deformable electrical conduction member is not operated timely in some cases when an abnormal condition occurs (when excessive current flows).

SUMMARY OF THE INVENTION

It is an object of the present invention to provide a circuit breaker capable of reliably interrupting a circuit in a short time to protect an electrical part when an abnormal signal of a vehicle is inputed.

To achieve the above object, according to a first aspect of the present invention, there is provided a circuit breaker comprising a conductive heating portion disposed between a first connecting terminal and a second connecting terminal such that the heating portion is in contact with the first connecting terminal and the second connecting terminal and having a heating agent therein, an ignitor accommodated in the heating portion for igniting the heating agent charged in the heating portion when abnormal conditions of a vehicle are encountered, an expandable resilient member which is disposed such that the resilient member is in contact with the heating portion for pushing the heating portion, a melting member for maintaining the resilient member in its compressed state, a first container for accommodating the heating portion, the ignitor, the resilient member and the melting member, a detecting portion for detecting an abnormality of the vehicle, a judging portion for judging whether the vehicle is under abnormal conditions based on an output from the detecting portion and for outputting a driving control signal when the judging portion judged that the vehicle is under the abnormal conditions, a driving portion for operating the ignitor based on the driving control signal from the judging portion, and a second container for accommodating the detecting portion, the judging portion and the driving portion, and the second container being integrally assembled with the first container.

According to the first aspect, if the detecting portion detects an abnormality of the vehicle, the judging portion judges whether the vehicle is under the abnormal conditions based on the output from the detecting portion, and if the judging portion judged that the vehicle is under the abnormal conditions, the judging means output the driving control signal, and the driving portion operates the ignitor based on the driving control signal from the judging portion. Therefore, the ignitor ignites the heating agent charged in the heating portion, the melting member is melted by the heat of the heating agent, the compressed resilient member is expanded and the heating portion jumps up. Therefore, the electrical connection between the heating portion and the first and second connecting terminals is cut off, and the circuit can be interrupted.

Accordingly, since the second container accommodating the detecting portion, the judging portion and the driving portion, and the second container being integrally assembled with the first container accommodating the heating portion, the ignitor, the resilient member and the melting member, a non-operational state of the ignitor due to disconnection of electric wire is eliminated.

According to a second aspect of the invention, in the circuit breaker of the first aspect, the circuit breaker further comprises a connector having a terminator whose one end is electrically connected to the ignitor, and a substrate provided for mounting the detecting portion, the judging portion and the driving portion into the second container, and the other end of the terminal is soldered to the substrate, and the driving portion and the ignitor are electrically connected to each other through the substrate and the terminal.

According to the second aspect, the one end of the terminal of the connector is electrically connected to the ignitor, the other end of the terminal is soldered to the substrate on which the driving portion is mounted, and the driving portion and the ignitor are electrically connected to each other through the substrate and the terminal. Therefore, there is no connection using electric wire and thus, an adverse possibility that the ignitor 29 is erroneously operated due to noise is reduced.

According to a third aspect of the invention, in the circuit breaker of the second aspect, the connector is detachable with respect to the ignitor, and the connector is disengaged from the ignitor when the ignitor is moved by ignition of the heating agent.

According to the third aspect, when the ignitor is pushed upward and moved by ignition of the heating agent, the connector is disengaged from the ignitor, and the power supply to the ignitor can be automatically stopped. With this structure, the current does not keep flowing, heat is not transmitted to the substrate and the like and thus, the electronic such as the substrate and device is less prone to be damaged.

According to a fourth aspect of the invention, in the circuit breaker of the first aspect, the detecting portion is a current sensor for detecting a current flowing through at least one of the first connecting terminal and the second connecting terminal, and the judging portion judges whether a current value detected by the current sensor became equal to or greater than a preset threshold value, and if the current value detected by the current sensor became equal to or greater than the threshold value, the judging portion outputs the driving control signal to the driving portion.

According to a fifth aspect of the invention, in the circuit breaker of the first aspect, the melting member is made of resin member which is formed in the first container and which prevents a pushing force of the resilient member against the heating portion.

According to the fifth aspect, since the melting member formed in the first container is made of resin member which prevents a pushing force of the resilient member against the heating portion, the resin member can be melted and the heating portion and the ignitor can be lifted up when the heating agent is ignited.

According to a sixth aspect of the invention, in the circuit breaker of the first aspect, an end of the heating portion is formed with a side wall, and the side wall is connected to the first connecting terminal and the second connecting terminal through a low-melting material.

According to the sixth aspect, since the side wall is connected to the first connecting terminal and the second connecting terminal through the low-melting material, if the resin member and the low-melting material are melted by the heat of the heating agent, the heating portion jumps up, the electrical connection between the first and second connecting terminals is cut off and therefore, the circuit can reliably be interrupted within a short time to protect an electric part. Further, since the spring force is not applied to the low-melting metal which connects the first and second connecting terminals and the heating portion, it is possible to enhance the reliability of the connected portion.

DETAILED DESCRIPTION OF PREFERRED EMBODIMENT

An embodiment of a circuit breaker of the present invention will be explained in detail with reference to the drawings.

The circuit breaker of the present embodiment is characterized in that a circuit from a battery to a load can be reliably interrupted within a short time when something is wrong with a vehicle, and the circuit breaker integrally provided with a breaker portion for interrupting the circuit and a control portion for controlling the breaker portion.

Figure 1:
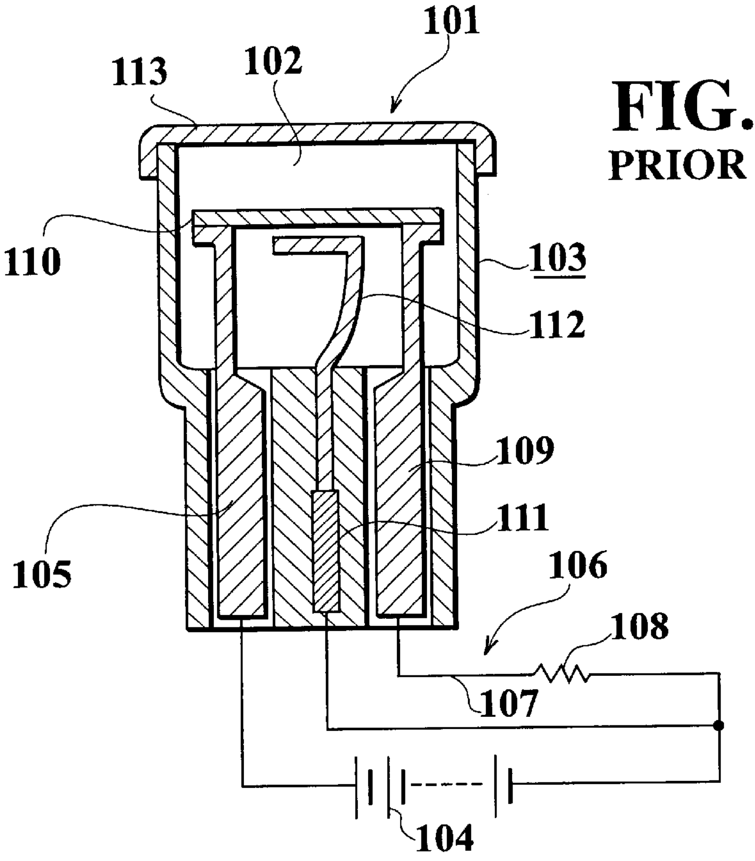
FIG.1 PRIOR ART
FIG. 1 is a sectional view showing one example of a conventional protecting apparatus using a bimetal.
Figure 2:
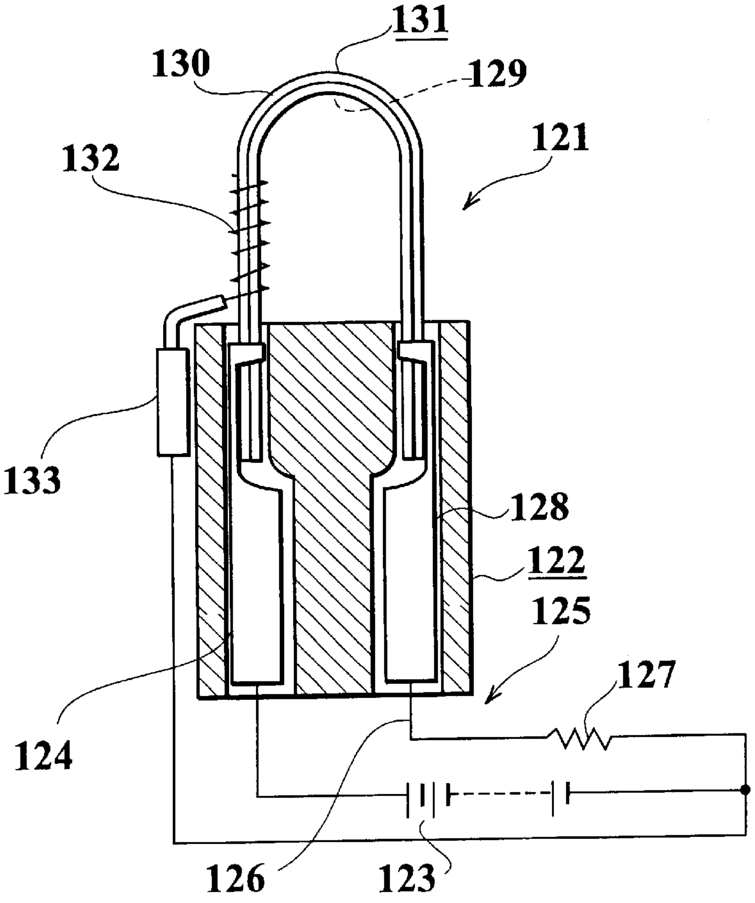
FIG.2 PRIOR ART
FIG. 2 is a sectional view showing another example of the conventional protecting apparatus.
Figure 3:
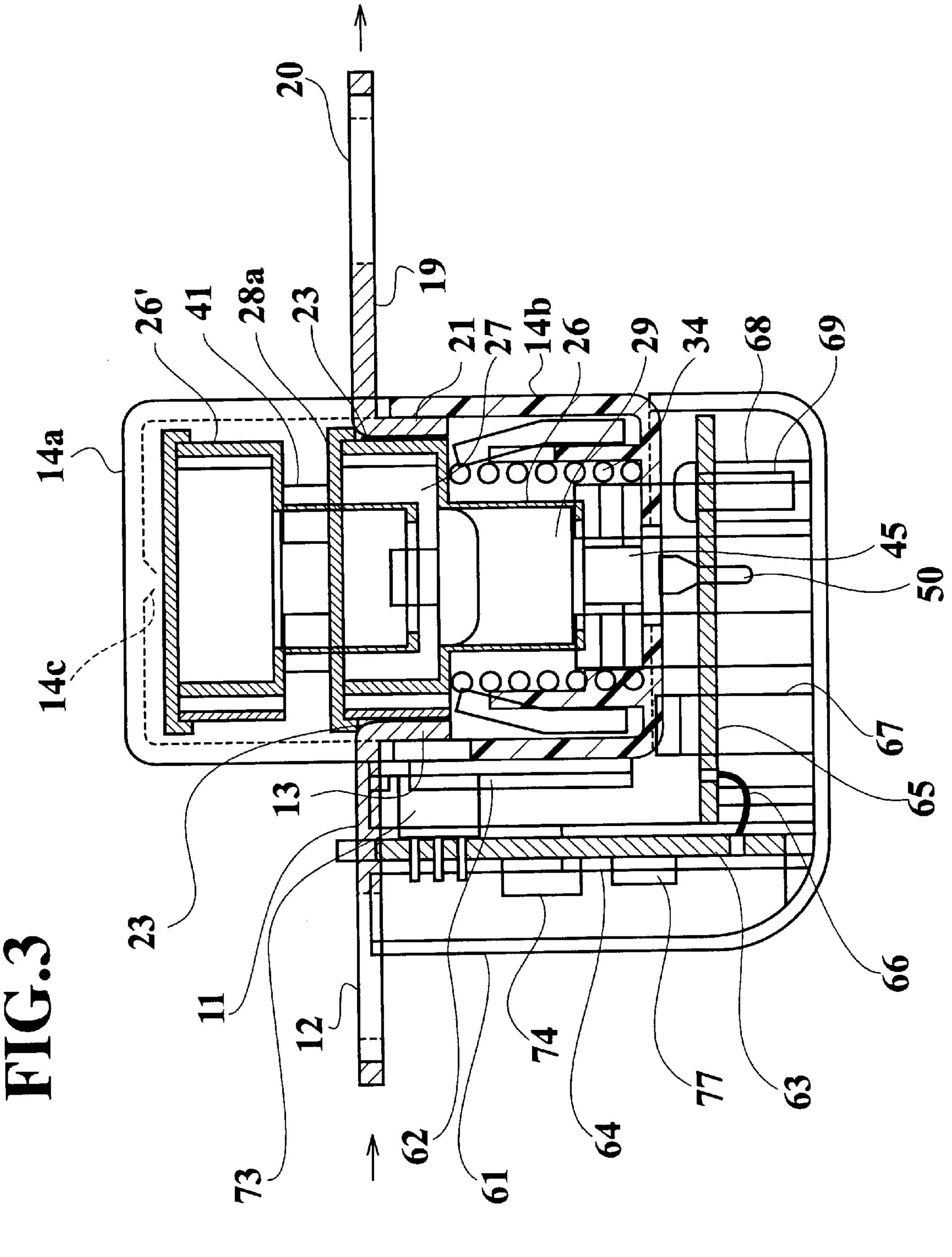
FIG. 3 is a sectional view of a circuit breaker of an embodiment taken along the line III—III in FIG. 4.
Figure 4:
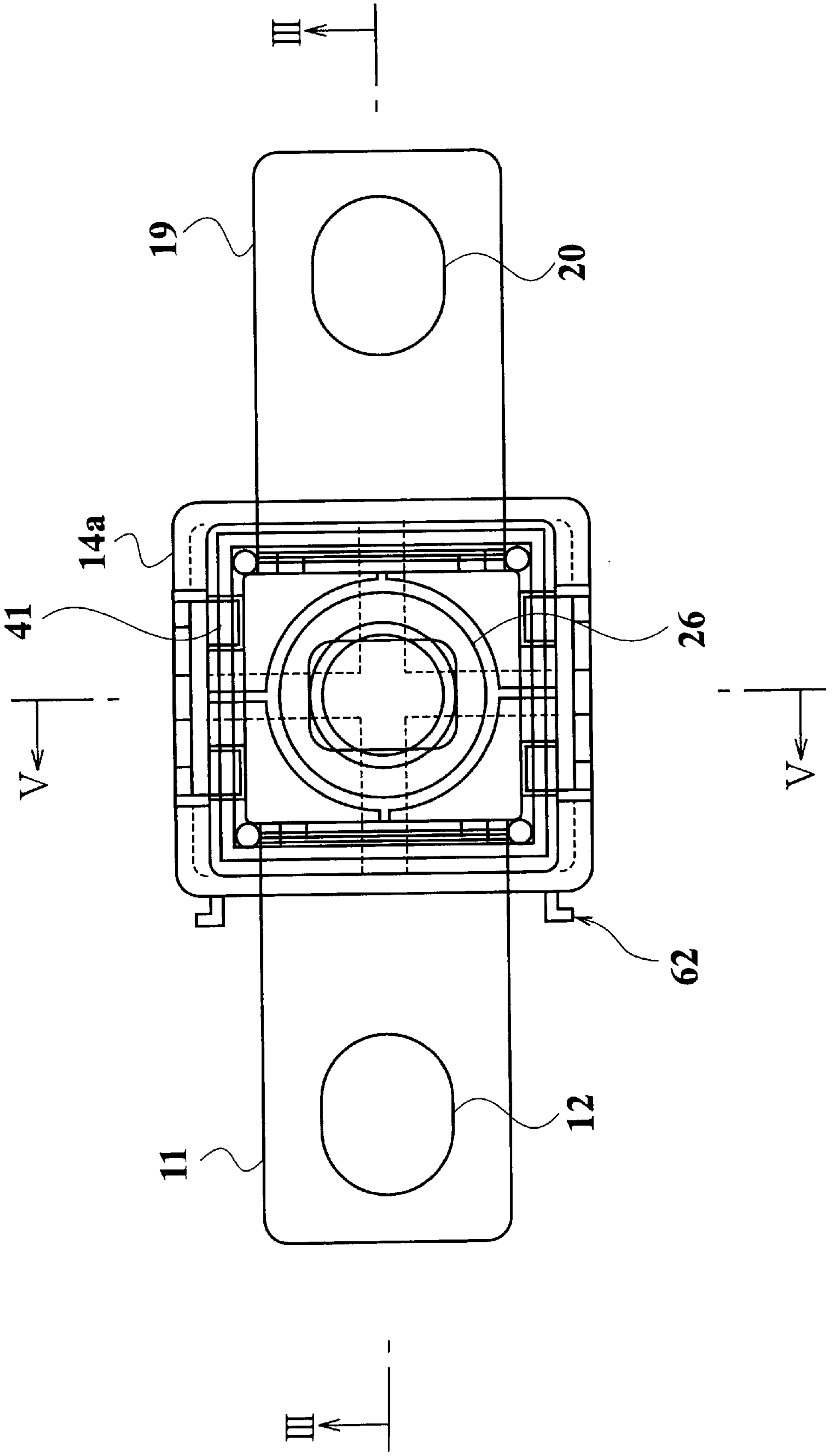
FIG. 4 is a top view of the circuit breaker of the embodiment.

In the circuit breaker shown in FIG. 3, a plate-like long first bus bar 11 is made of copper or copper alloy for example, and is formed with a round hole 12 connected to a battery or the like. The first bus bar 11 is bent downward substantially at the right angle.

A plate-like long second bus bar 19 is also made of copper or copper alloy for example, and is formed with a round hole 20 connected to a load or the like. The second bus bar 19 is also bent downward substantially at the right angle.

A gap **14*a* and a resin case 14*b* are disposed between the first bus bar 11 and the second bus bar 19. The gap 14*a* and the resin case 14*b*** constitute a first container made of insulating material such as resin (thermoplastic resin).

A thermite case 26 made of copper, copper alloy or the like is accommodated in the resin case **14*b*, and a heating agent 27 is charged in the thermite case 26, and an ignitor 29 is accommodated in the thermite case 26**.

The ignitor 29 includes an igniting agent which is ignited by heat generated by current flowing through a terminal 50 of a connector 45 when something is wrong with the vehicle, thereby allowing the heating agent 27 to generate a thermite reaction heat.

A left side wall formed on the thermite case 26 is connected to a bus bar tip end 13 through low-melting metal 23 as low-melting material such as solder (melting point is 200° C. to 300° C.) or the like. A right side wall formed on the thermite case 26 is connected to a bus bar tip end 21 through low-melting metal 23. Therefore, the first bus bar 11 and the second bus bar 19 can be electrically connected to each other through the low-melting metal 23 and the thermite case 26.

The low-melting metal 23 is made of at least one metal selected from Sn, Pb, Zn, Al and Cu.

The heating agent 27 is made of metal-oxide powder such as ferric oxide ($Fe_2O_3$) and aluminum powder, and is thermite agent which thermite-reacts by heat of the lead wire 31 to generate high heat. Chromic oxide ($Cr_2O_3$), manganese oxide ($MnO_2$) or the like may be used instead of ferric oxide ($Fe_2O_3$).

The heating agent 27 may be made of mixture comprising at least one metal powder selected from B, Sn, Fe, Si, Zr, Ti and Al; at least one metal selected from CuO, $MnO_2$, $Pb_3O_4$, $PbO_2$, $Fe_3O_4$ and $Fe_2O_3$; and at least one additive comprising alumina, bentonite and talc. Such a heating agent is easily is ignited by the ignitor 29, and the low-melting metal 23 can be melted within a short time.

An expandable compression spring 34 is disposed as a resilient member between the thermite case 26 and the resin case **14*b*, and this compression spring 34 pushes the thermite case 26** upward.

Figure 5:
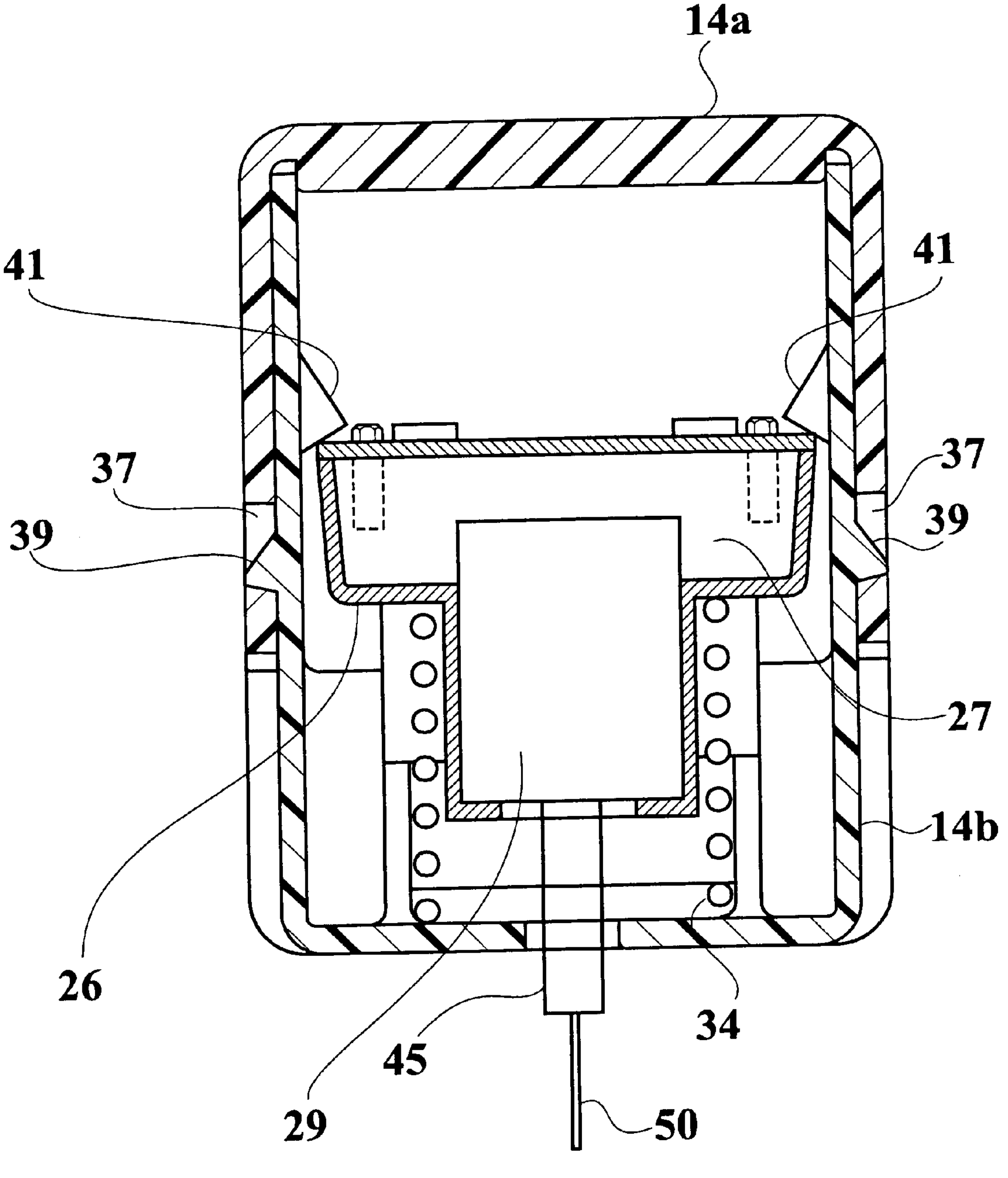
FIG. 5 is a sectional view of the circuit breaker of the embodiment taken along the line V—V in FIG. 4.

As shown in FIG. 5, the cap 14*a* is formed with a groove 37, and a first projection 39 formed on the resin case 14*b* is engaged with the groove 37. The resin case 14*b* is formed with a second projection 41 made of resin which is melted by heat. The second projection 41 pushes an upper face of the thermite case 26 to prevent the thermite case 26 from moving upward by a spring force of the compression spring 34.

A connector 45 having a terminal 50 is detachably mounted to the ignitor 29. One end of the terminal 50 is connected to a heater (not shown) provided on the ignitor 29, and the other end of the terminal 50 is soldered to a second substrate 65. With this structure, the current from the second substrate 65 flows into the heater through the terminal 50, and the ignitor 29 is operated by heat generated by the heater.

A pair of L-shaped and inverted L-shaped container-assembling ribs 62 are formed on the resin case 14*b*. An outer container 61 as a second container is assembled to the resin case 14*b* through the pair of container-assembling ribs 62.

This outer container 61 accommodates a first substrate 63 disposed substantially in parallel to the left side wall of the resin case 14*b*, and a second substrate 65 disposed substantially vertically with respect to the first substrate 63 such that the second substrate 65 is opposed to a bottom face of the resin case 14*b*. The first substrate 63 is assembled to a substrate-assembling portion 64 which is formed in the outer container 61, and comprises a current sensor 73, a central processing unit (CPU) 74, a driving circuit 77 and the like. The current sensor 73 comprises a magnetoelectric converting element and the like disposed in the vicinity of the first bus bar 11 for detecting a current flowing to the first bus bar 11.

The outer container 61 is formed with projections 67 and 68, and the second substrate 65 is screwed to the projection 68 by a screw 69 and fixed to the outer container 61. The second substrate 65 is electrically connected to the first substrate 63 through a jumper wire 66, and the other end of the terminal 50 of the connector 45 is soldered to the second substrate 65. With this structure, a current is supplied from the driving circuit 77 of the first substrate 63 to the ignitor 29 through the second substrate 65 and the terminal 50.

Figure 6:
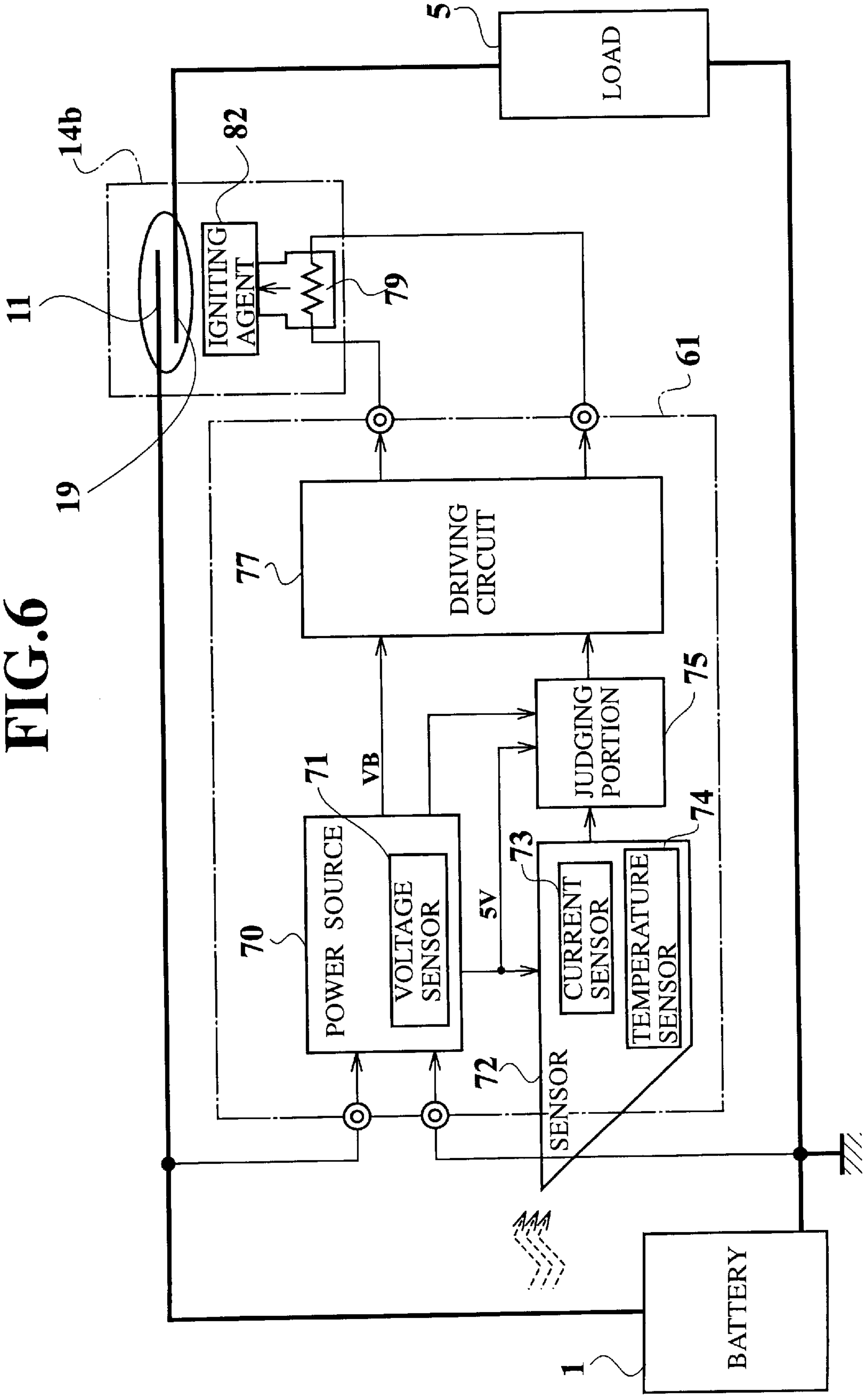
FIG. 6 is a block diagram of the circuit breaker of the embodiment.

Next, details of the circuit structure in the outer container provided in the circuit breaker will be explained with reference to FIG. 6. As shown in FIG. 6, the circuit breaker is provided between the battery 1 and the load 5, and comprises a power source 70 having a voltage sensor 71 for detecting a voltage from the battery 1, a sensor 72 having a current sensor 73 and a temperature sensor 74, a judging portion 75, the driving circuit 77, a heater 79, the igniting agent 82 which is ignited by heat of the heater 79, the first bus bar 11 and the second bus bar 19.

The power source 70, the sensor 72, the judging portion 75 and the driving circuit 77 are provided in the outer container 61. The heater 79, the igniting agent 82, the first bus bar 11 and the second bus bar 19 are provided in the resin case 14*b*.

The power source 70 is of 5V for example, opposite end voltages of the battery 1 are input to the power source 70, and the power source 70 supplies voltage to the sensor 72, the judging portion 75 and the driving circuit 77. The current sensor 73 detects a current flowing through the load 5, and is a Hall device or the like for converting a magnetic field generated by the current into an electric signal. The temperature sensor 74 is a thermistor for example for detecting a temperature by resistance varied by heat generated by the current.

The judging portion 75 comprises the CPU 74, and judges whether a current value detected by the current sensor 73 becomes equal to or greater than a threshold current value. The driving circuit 77 includes a field-effect transistor (FET) or the like for example, and turns the heater 79 ON to allow a current to flow when the judging portion 75 judges that the current value detected by the current sensor 73 becomes equal to or greater than the threshold current value.

The judging portion 75 may turn the FET ON to allow a current to flow to the heater 79 when a temperature value detected by the temperature sensor 74 becomes equal to or greater than a threshold temperature, or may turn the FET ON to allow a current to flow to the heater 79 when a voltage value detected by the voltage sensor 71 becomes abnormal voltage value.

The igniting agent 82 is ignited by the heat of the heater 79 to interrupt the electrical connection between the first bus bar 11 and the second bus bar 19 to cut off the power source supply from the battery 1 to the load 5.

Next, the operation of the circuit breaker of the present embodiment structured as described above will be explained with reference to the drawings.

First, under the normal condition, the first bus bar 11 and the second bus bar 19 are electrically connected to each other through the low-melting metal 23 and the thermite case 26, and a current is supplied to the load (not shown) from the battery (not shown).

Next, if the current sensor 73 provided in the outer container 61 detects a current flowing through the first bus bar 11, the judging portion 75 judges whether the current value detected by the current sensor 73 became equal to or greater than a preset threshold current value.

If the detected current value became equal to or greater than the threshold current value, the driving circuit 77 provided on the first substrate 63 allows a current to flow to the heater 79 of the ignitor 29 through the second substrate 65 and the terminal 50. Then, the ignitor 29 is ignited by heat generated by the current and therefore, the heating agent 27 which is a thermite agent generates a thermite reaction heat according to the following reaction expression:

$$Fe_2O_3+2Al \rightarrow Al_2O_3+2Fe+386.2\ Kcal$$

The thermite case 26 is heated by the thermite reaction heat, the low-melting metals 23 connecting the bus bar tip end 13 and the left side wall of the thermite case 26 to each other, as well as the low-melting metal 23 connecting the bus bar tip end 21 and the right side wall of the thermite case 26 are heated and melted by heat of the heating agent 27 and the thermite case 26. Simultaneously with this, the second projection 41 made of resin member formed on the resin case 14*b* is melted by the heat.

As a result, the compression spring 34 which had been compressed is expanded, and the thermite case 26 accommodating the ignitor 29 jumps upward (26' in FIG. 3 represents the thermite case after it moved upward).

Therefore, the electrical connection between the thermite case 26, the first bus bar 11 and the second bus bar 19 is cut off. That is, the first bus bar 11 and the second bus bar 19 are electrically interrupted, and the electric circuit of the vehicle is interrupted.

When the ignitor 29 and the thermite case 26 jumped up, the connector 45 is disengaged from the ignitor 29.

As described above, according to the circuit breaker of the present embodiment, it is possible to reliably interrupt the electric circuit of a vehicle within a short time to protect an electrical part.

Further, since the outer container 61 in which the current sensor 73, the judging portion 75 and the driving circuit 77 are accommodated is integrally assembled with the cap 14*a* and the resin case 14*b* in which the thermite case 26, the ignitor 29, the compression spring 34 and the second projection 41 are accommodated, non-operational state of the ignitor 29 due to disconnection of electric wire from the driving circuit 77 is not generated.

Further, the one end of the terminal 50 is electrically connected to the ignitor 29, the other end of the terminal 50 is soldered to the second substrate 65 and the driving circuit 77 and the ignitor 29 are electrically connected to each other through the second substrate 65 and the terminal 50. Therefore, there is no connection using electric wire and thus, an adverse possibility that the ignitor 29 is erroneously operated due to noise is reduced.

Even if the number of circuit protecting portions is varied, it is possible to deal with a plurality of circuit protecting portions by commonly using the control portion without changing the control portion such as the current sensor 73, the judging portion 75 and the driving circuit 77 included in the outer container 61. Further, the breaker portion and the controlling portion are integrally formed, it is possible to simplify the wire harness and the connector constituting peripheral circuits of the circuit breaker.

Further, since the second projection 41 formed in the resin case 14*b* prevents the compression spring 34 from expanding upward, the spring force is not applied to the low-melting metal 23 which connects the first bus bar 11, the second bus bar 19 and the thermite case 26 and thus, it is possible to enhance the reliability of the connected portion.

Furthermore, since the ignitor 29 is disengaged from the connector 45 and lifted up after ignitor, power supply to the ignitor 29 can automatically stopped. With this structure, the current does not keep flowing, heat is not transmitted to the substrate and the like and thus, the electronic such as the substrate and device is less prone to be damaged.

Further, since the cap 14*a* is put on the resin case 14*b*, the thermite case 26 will not jump out from the cap 14*a* when the circuit is interrupted, and this can prevent a burn caused by heat.

The, present invention is not limited to the circuit breaker of the above-described embodiment. Although the compression spring 34 and the low-melting metal 23 are provided, and the circuit is interrupted when the second projection 41 and the low-melting metal 23 are melted in the embodiment, only the second projection 41 may be provided without providing the low-melting metal 23, and the circuit may be interrupted when the second projection 41 is melted.

In the circuit breaker of the embodiment, the second projection 41 formed on the resin case 14*b* pushes the upper face of the thermite case 26, and the upward movement of the thermite case 26 by the spring force of the compression spring 34 is prevented.

For example, the thermite case 26 may be formed with a screw this screw may be threadedly engaged with another screw made of resin member as a melting member formed on the resin case 14*b*, and the upward movement of the thermite case 26 by the spring force of the compression spring 34 may be prevented by fixing the thermite case 26 to the resin case 14*b*.

In this case, when the thermite case 26 is heated, the screw made of resin member formed on the resin case 14*b* is melted, the thermite case 26 is moved upward by the spring force of the compression spring 34 to interrupt the circuit.

Although the second projection 41 and the screw were indicated as the melting members, the melting members are not limited to those, and the melting member may be a resin member or a low-melting metal which maintains the compression spring 34 in its compressed state under a normal condition, and which is melted by heat when a circuit is to be interrupted. It is of course possible to make various modifications without departing from the spirit or scope of the invention.

What is claimed is:

1. A circuit breaker comprising a conductive heating portion disposed between a first connecting terminal and a second connecting terminal such that the heating portion is in contact with the first connecting terminal and the second connecting terminal and having a heating agent therein, an ignitor accommodated in the heating portion for igniting the heating agent charged in the heating portion when abnormal conditions of a vehicle are encountered, an expandable resilient member which is disposed such that the resilient member is in contact with the heating portion for pushing the heating portion, a melting member for maintaining the resilient member in its compressed state, a first container for accommodating the heating portion, the ignitor, the resilient member and the melting member, a detecting portion for detecting an abnormality of the vehicle, a judging portion for judging whether the vehicle is under abnormal conditions based on an output from the detecting portion and for outputting a driving control signal when the judging portion judged that the vehicle is under the abnormal conditions, a driving portion for operating the ignitor based on the driving control signal from the judging portion, and a second container for accommodating the detecting portion, the judging portion and the driving portion, and the second container being integrally assembled with the first container.

2. A circuit breaker according to claim 1, further comprising a connector having a terminator whose one end is electrically connected to the ignitor, and a substrate provided for mounting the detecting portion, the judging portion and the driving portion into the second container, wherein the other end of the terminal is soldered to the substrate, and the driving portion and the ignitor are electrically connected to each other through the substrate and the terminal.

3. A circuit breaker according to claim 2, wherein the connector is detachable with respect to the ignitor, and the connector is disengaged from the ignitor when the ignitor is moved by ignition of the heating agent.

4. A circuit breaker according to claim 1, wherein the detecting portion is a current sensor for detecting a current flowing through at least one of the first connecting terminal and the second connecting terminal, and the judging portion judges whether a current value detected by the current sensor became equal to or greater than a preset threshold value, and if the current value detected by the current sensor became equal to or greater than the threshold value, the judging portion outputs the driving control signal to the driving portion.

5. A circuit breaker according to claim 1, wherein the melting member is made of resin member which is formed in the first container and which prevents a pushing force of the resilient member against the heating portion.

6. A circuit breaker according to claim 1, wherein an end of the heating portion is formed with a side wall, and the side wall is connected to the first connecting terminal and the second connecting terminal through a low-melting material.

* * * * *